(12) United States Patent
Hansen et al.

(10) Patent No.: US 6,589,583 B1
(45) Date of Patent: Jul. 8, 2003

(54) FREEZER TO OVEN DOUGH PRODUCTS

(75) Inventors: Laura M. Hansen, White Bear Lake, MN (US); Brian Robert Anderson, Shakopee, MN (US); Matthew W. Lorence, Plymouth, MN (US); Jeffrey D. Reinke, Waconia, MN (US)

(73) Assignee: The Pillsbury Company, Minneapolis, MN (US)

( * ) Notice: Subject to any disclaimer, the term of this patent is extended or adjusted under 35 U.S.C. 154(b) by 0 days.

(21) Appl. No.: 09/431,639

(22) Filed: Nov. 1, 1999

(51) Int. Cl.$^7$ ............. A21D 2/02; A21D 10/02
(52) U.S. Cl. ............. 426/551; 426/549; 426/94; 426/553
(58) Field of Search ............. 426/549, 551, 426/552, 553, 556, 558, 563

(56) References Cited

U.S. PATENT DOCUMENTS

| | | | |
|---|---|---|---|
| 2,550,491 A | * 4/1951 | McDonald | |
| 4,230,730 A | 10/1980 | Lauck | 426/128 |
| 4,374,151 A | * 2/1983 | Lindstrom et al. | 426/19 |
| 5,194,273 A | 3/1993 | de Bruijne et al. | 426/94 |
| 5,254,351 A | 10/1993 | de Boer et al. | 426/23 |
| 5,589,207 A | 12/1996 | Larsen et al. | 426/20 |
| 5,804,233 A | 9/1998 | Lonergan et al. | 426/19 |
| 5,855,945 A | * 1/1999 | Laughlin et al. | 426/549 |
| 6,013,300 A | * 1/2000 | Reichkitzer et al. | 426/552 |

FOREIGN PATENT DOCUMENTS

| | | |
|---|---|---|
| EP | 0 145 367 | 6/1985 |
| EP | 0 156 573 | 10/1985 |
| EP | 0 305 071 A2 | 3/1989 |
| EP | 0 542 353 A1 | 5/1993 |
| EP | 0 620 974 | 10/1994 |
| EP | 0 796 560 A1 | 9/1997 |
| GB | 1 586 584 | 3/1981 |
| WO | WO 92/11767 | 7/1992 |
| WO | WO 92/18010 | 10/1992 |
| WO | WO 93-06732 | 4/1993 |
| WO | 00 76321 | 12/2000 |

OTHER PUBLICATIONS

International Search Report PCT/US00/29977.

* cited by examiner

*Primary Examiner*—Milton I. Cano
*Assistant Examiner*—Robert Madsen
(74) *Attorney, Agent, or Firm*—Kagan Binder PLLC

(57) ABSTRACT

The present invention provides freezer-to-oven dough products, as well as methods for preparing the dough products. Specifically, the dough products of the present invention include a chemical leavening system comprising a plurality of chemical leavening acids having different temperature ranges within which they are active as chemical leaveners. Such a chemical leavening system provides for the staged rising, i.e., rising that occurs over a wide temperature range and thus during a substantial portion of the cooking cycle, of the dough products of the present invention when cooked. By providing frozen dough products with such a leavening system, the need for a preproofing step prior to freezing, a thawing step or an intervening proofing step prior to cooking is avoided, and yet, the dough product is capable of substantial expansion upon cooking, thereby producing a cooked dough product with excellent visual and organoleptic properties.

17 Claims, No Drawings

FREEZER TO OVEN DOUGH PRODUCTS

FIELD OF THE INVENTION

This invention relates to dough products, and methods of preparing the dough products. In particular, the invention relates to dough products comprising a chemical leavening system comprising a plurality of chemical leavening acids having different temperature ranges within which they are active as chemical leaveners. An unproofed frozen dough product comprising such chemical leavening system undergoes a staged rising upon heating to produce a cooked dough product with excellent visual and organoleptic properties, without requiring an intervening thawing or proofing step prior to cooking.

BACKGROUND OF THE INVENTION

Freshly baked dough products, such as breads, pastries, Danishes and sweet rolls, are the object of high demand from the consuming public. These products are highly desired not only due to their taste and the dietary satisfaction that is achieved by consuming them, but also, because the preparation of such products, particularly within a home environment, can serve many useful and/or desirable functions. For example, the preparation of such dough products can serve to provide entertainment for those who enjoy cooking these items, a sense of satisfaction to those who enjoy the challenge of preparing such items, and furthermore, can create a comfortable, "homey" atmosphere by virtue of the aroma that is produced when these items are baked.

However, certain baked dough products can be difficult to produce, sometimes to such an extent that their production either in a home or commercial setting becomes prohibitively time consuming. Some dough products, for example, require extended periods of mixing and/or kneading which can not only be time consuming, but for some individuals, can be difficult to perform. Additionally, leavened dough products, i.e., those that comprise either yeast or chemical leavening systems in order to provide a final baked product with a desired baked specific volume or width to height ratio, often require lengthy "proofing" steps, i.e., wherein the dough is allowed to rise until double or triple in size. Depending on the desired final baked specific volume of the dough product, these proofing steps typically take from one to several hours to complete.

Several of these difficulties can be overcome by consumers and/or commercial institutions by utilizing pre-made dough products. That is, pre-mixed dough products are commercially available which obviate the need for mixing and kneading the dough. For example, frozen varieties of bread dough and dough for rolls, as well as refrigerated varieties of sweet rolls, Danishes, and pizza dough, are commercially available at most supermarkets. Although such products provide a viable, time-saving alternative to preparing these same items from scratch, these products can suffer from drawbacks that may make them suboptimal for use in some situations.

Such dough products, although more convenient in that mixing and kneading of the dough is typically not required, can still be undesirably time consuming and/or difficult to prepare. Frozen dough products, for example, generally require a thawing step and a proofing step before they can be baked. Thus, the preparation of these products, although easier, is still time consuming, by virtue of the lengthy amount of time required to thaw and/or proof these items prior to baking. Also, refrigerated dough products are often preproofed prior to packaging. As a result, the manufacture of these products incurs the inconvenience of accommodating the necessary proofing time into the manufacturing process, which may be undesirable in some applications. Additional manufacturing equipment, i.e., proofing cabinets, may also be necessary to perform such preproofing steps, thus necessitating that additional expense be incurred. Furthermore, the shipping and storage of preproofed refrigerated dough items can be problematic in that such items may require more delicate handling, stronger packaging and/or more storage space than their unproofed counterparts.

In efforts to provide dough products that are more easily and conveniently prepared, several attempts have been made to develop freezer-to-oven dough products, i.e., products that are capable of proceeding directly from the freezer to the oven without an intermediate thawing or proofing step. In one approach, described in U.S. Pat. No. 5,254,351 to de Boer et al and European Patent Application Nos. EP 0 542 353 A1 to Boode-Boissevain, EP 0 305 071 to Seneau, and EP 0 796 560 A1 to Karinthi, the dough product is "preproofed" before it is frozen. Then, when the dough product is to be baked, a proofing step is not required and the dough product may be placed directly in the oven or other cooking device.

These types of dough products, although more convenient for the end consumer, can provide an end product baked good that has less desirable textural and organoleptic properties due at least in part to the act of proofing the dough product prior to freezing. That is, when a leavened dough product is proofed or allowed to rise, a leavener reacts with another material in the dough to produce gas. The produced gas forms pockets throughout the dough and the formation of these pockets, in turn, causes the dough structure to expand. This expansion typically weakens the gluten structure of the dough, a weakness that is further exacerbated by the formation of ice crystals as the dough temperature reaches a temperature at which substantial amounts of water will freeze. Dough products with such a weakened gluten structure have a tendency to collapse upon baking.

Also as a result of the generally fragile gluten structure of pre-proofed products, such products can also be more difficult to manipulate and package than non-proofed dough products. That is, inasmuch as it is undesirable to disrupt or disturb the gluten structure that is formed upon proofing, the dough product must be handled carefully in order to preserve the proofed gluten structure. In commercial or manufacturing applications, the level of care necessary to preserve the structure may be difficult, if not impossible to attain, due, for example, to time constraints, the level of skill of the worker or the mechanical limitations of the processing equipment. Furthermore, preproofed frozen dough items are necessarily larger than their non-proofed counterparts, and thus the shipping and storage of such items requires more space, which can be costly for the shipper of such items, as well as inconvenient for the end-user.

In addition to the aforementioned efforts, other attempts have focused on the inclusion of particular types of leavening systems, rather than a preproofing step, in order to provide dough products which are more convenient for the end-user to prepare. For example, U.S. Pat. No. 5,589,207 to Larsen discloses a method of producing a freezer-to-oven dough product, wherein the disclosed dough comprises yeast and an amount of an amylase, which functions to provide the yeast with fermentable saccharides. However, although a certain amount of yeast is desirably included in many dough products due to the distinctive and desirable flavor that results from its inclusion, this approach, as well as others that provide dough products that employ only yeast as the leavening system, can result in the production of a suboptimal baked dough product in freezer-to-oven applications.

In particular, freezer-to-oven dough products that comprise yeast as the only leavening agent generally do not provide a baked dough product with the desired baked specific volume and/or organoleptic properties. This is at least partially due to the fact that these types of dough products are not proofed prior to baking, and thus, any and all desired expansion and structural development of the dough product must occur during baking, and in particular, in the early part of the bake cycle, before the dough reaches a temperature at which it begins to set. Also, since yeast has an optimal temperature range during which it produces substantial amounts of gas, i.e., from about 80° F. to about 90° F., and furthermore, is killed, and thus rendered ineffective, at temperatures of about 140° F., there are only a few minutes within this early portion of the bake cycle that the yeast will actually be active and capable of generating gas and expanding the dough. Such a short amount of time is generally insufficient for a desirable dough structure to develop, and as a result, the baked dough products produced by freezer-to-oven dough products comprising yeast as the only leavener typically have a doughy, dense texture, and often do not have the desired baked specific volumes achieved by their conventionally prepared counterparts.

Finally, several attempts to provide acceptable freezer to oven dough products have involved the use of a single chemical leavener, alone or in combination with yeast. Although these dough products provide an acceptable cooked product without a proofing step, the leavener, with or without yeast, within such dough products does not function optimally when a thawing step is omitted. Thus, these dough products generally do not provide desired convenience of being able to proceed directly from the oven to the freezer inasmuch as these products require an intervening thawing step in order to function optimally and thus, these products are generally not acceptable for use in freezer-to-oven applications.

The prior art has provided one successful attempt at providing a freezer-to-oven dough product with excellent organoleptic properties and dough structure in the form of Cini-mini cinnamon rolls, commercially-available at most Burger King® franchises. Cini-mini cinnamon rolls are supplied to this commercial institution as a frozen product, and can be subsequently baked at each individual franchise without an intervening thawing or proofing step. Although the Cini-mini contains only one leavening acid and yeast as the leavening system, and in contrast to the above described products comprising such a leavening system, the Cini-mini is a successful freezer-to-oven product, due at least in substantial part to the fact that it is marketed as, and desirably is, a small product.

Most dough products desirably expand substantially during proofing and baking to provide a standard sized dough product, i.e., undergo an increase in volume of from about 200% to about 300%. In order to achieve this amount of expansion, such dough products typically must be proofed prior to baking inasmuch as such an amount of expansion typically cannot occur in the amount of time during the bake cycle that the leavener is active and that the dough structure has not become set. In contrast, since baked Cini-mini rolls are desirably a small product, such a substantial expansion is not required to produce a satisfactory Cini-mini roll, and in fact, the degree of expansion, typically from about 50% to about 100%, that is required to produce an optimal Cini-mini roll is easily accomplished by this product during the early part of the baking cycle, prior to the setting of the dough structure. However, although Cini-mini rolls have sufficient visual and organoleptic qualities to render them a commercial success, it is still desirable to provide freezer-to-oven dough products that are capable of substantial expansion, i.e., expansion of 150% or greater in volume, during the baking cycle so as to provide more standard sized baked dough products.

Thus, it would be desirable to provide a freezer-to-oven dough product that does not require a proofing or thawing step at any stage of preparation and yet provides a final baked dough product that has excellent visual and organoleptic properties. It would further be desirable for such a dough product to be capable of substantially expanding during the baking cycle to produce a standard sized dough product, i.e., that is wider than it is tall.

SUMMARY OF THE INVENTION

According to the present invention, the above objectives and other objectives apparent to those skilled in the art upon reading this disclosure are attained by the present invention which is drawn to a freezer-to-oven dough products and methods of producing and cooking the dough products. Specifically, the freezer-to-oven dough products of the present invention comprise a chemical leavening system that provides for the staged rising, i.e., rising that occurs over a wide temperature range and thus during a substantial portion of the cooking cycle, of the dough product when cooked. By providing frozen dough products with such a leavening system, the need for a preproofing step prior to freezing, a thawing step or an intervening proofing step prior to cooking is avoided, and yet, the dough product is capable of substantial expansion upon cooking, i.e., at least about a 150% increase in volume as compared to the volume of the frozen dough product. Further, the resulting cooked dough product has excellent visual and organoleptic properties.

Thus, in one aspect, the present invention provides an unproofed, frozen dough product comprising flour, water and yeast and a chemical leavening system comprising a plurality of chemical leavening acids having different temperature ranges within which they are active as chemical leaveners. Preferably, the dough product comprises a laminated dough. Due at least in substantial part to the ability of the chemical leavening system to provide the dough product with the ability to rise during a substantial portion of the cooking cycle, a cooked dough product with excellent visual and organoleptic properties can be obtained by subjecting the unproofed, frozen dough product of the present invention to a cooking cycle without an intervening thawing or proofing step prior to cooking. In certain preferred embodiments, the visual properties of the dough product of the present invention may be further enhanced by including an amount of a freezing point depressant which acts to reduce or eliminate the amount of tearing on the external surface of the dough product that may otherwise occur during cooking.

Due to the excellent visual and organoleptic properties of the cooked dough product prepared from an unproofed, frozen dough product of the present invention, in another aspect, the present invention further provides a freezer-to-oven dough product comprising flour, water, yeast and a chemical leavening system comprising a plurality of chemical leavening acids having different temperature ranges within which they are active as chemical leaveners. In another aspect, the present invention provides a freezer-tooven dough product comprising flour, water, yeast and a chemical leavening system. The dough product has a first state wherein the dough product is unproofed and frozen and a second state wherein the dough product is cooked and has a volume at least about 150% greater than the volume of the dough product in the first state. The chemical leavening system causes staged rising of the dough product during a cooking cycle so that the second state of the dough product can be achieved by subjecting the dough product in the first state to a cooking cycle without an intervening thawing or proofing step.

Because the unproofed frozen dough products of the present invention may advantageously be used to produce cooked dough products without a requisite preproofing step prior to freezing, a thawing step or a proofing step prior to cooking, freshly baked dough products can be easily and conveniently produced by the end-user utilizing the unproofed, frozen dough products of the present invention. Therefore, in yet another aspect, the present invention provides a method for preparing an unproofed cooked dough product. Specifically, the method involves preparing an unproofed dough product comprising flour, water and yeast as well as a chemical leavening system. The unproofed dough product is then frozen and the frozen unproofed dough product subsequently cooked, during which cooking step the chemical leavening system causes the staged rising of the dough product. The resulting cooked dough product has excellent visual and organoleptic properties.

Finally, in yet another aspect, the present invention provides a method for preparing an unproofed, frozen dough product comprising preparing an unproofed dough product comprising flour, water, yeast and a chemical leavening system comprising a plurality of chemical leavening acids having different temperature ranges at which they are active as chemical leaveners.

As used herein, the phrase "freezer-to-oven" is meant to indicate that the dough product of the present invention may advantageously proceed directly from a substantially frozen state to a heated environment for cooking without an intervening step that would be sufficient to at least partially thaw or proof the dough product. The phrase "staged rising" is meant to indicate rising that occurs during at least 40% of the cooking cycle, preferably during 50% of the cooking cycle, more preferably during 60% of the cooking cycle. The phrase "cooking cycle" is meant to indicate a length of time and an amount of energy, i.e., in the form of heat or microwave radiation, sufficient to cook a dough product subjected to the cooking cycle, i.e., to result in an internal dough temperature of from about 170° F. to about 210° F.

Also as used herein the term "unproofed" is meant to indicate dough products that have not been subjected to conditions effective to at least partially proof the dough product, i.e., to cause the dough product to increase in volume 10% or more. Furthermore, as used herein, the term "frozen" as applied to dough products is meant to indicate that the dough product has an internal temperature of less than about 10° F. Finally, unless otherwise indicated, all percentages are weight percentages based upon the total weight of the dough product.

DETAILED DESCRIPTION OF THE INVENTION

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

The present invention provides freezer-to-oven dough products that may be cooked from a frozen state, without an intervening thawing or proofing step, to produce cooked dough products with excellent visual and organoleptic properties. As a result, the dough products of the present invention are easily and conveniently utilized by an end-user, whether a homemaker or a commercial baker, to produce such cooked dough products. In addition to providing such convenience to the end-user, the dough products of the present invention provide convenience to the manufacturer of the dough products in that the dough products of the present invention do not require a pre-proofing step prior to freezing. Thus, the amount of time that the dough products would normally spend proofing during dough processing is saved, and furthermore, the added expense for additional equipment required to perform such a preproofing step, i.e., proofing cabinets and the like, is avoided.

In particular, the dough products of the present invention include conventional dough ingredients, i.e., at least flour, water and yeast, and additionally, a chemical leavening system that results in the staged rising of the dough products when the frozen dough products are cooked. Due to the staged rising that occurs as a result of the inclusion of the chemical leavening system, the dough products are capable of expanding during a substantial portion, i.e., at least 40%, of the cooking cycle, thereby producing cooked dough products with visual and organoleptic properties comparable to their proofed counterparts and oftentimes superior than other conventional freezer-to-oven dough products. In particular, cooked dough products produced in accordance with the present invention advantageously attain a cooked volume of at least about 150%, preferably 200%, more preferably 250% and most preferably 300% of the volume of the unproofed, frozen dough products.

Cooking cycles typically used to produce cooked dough products generally do not provide a sufficiently lengthy time during which rising can occur to produce acceptable cooked dough products from conventional unproofed, frozen dough products for at least two reasons. First of all, many dough products develop a set dough structure relatively early in the cooking cycle, thereby providing a physical barrier that can substantially hinder, or even prevent, additional rising from occurring later in the bake cycle. Secondly, many leaveners, including yeast and most chemical leaveners, are active or effective only during a fairly narrow temperature range. For these reasons, conventional frozen dough products, i.e., dough products comprising only yeast and/or a single chemical leavener as the leavening system, typically produce suboptimal cooked dough products in freezer-to-oven applications.

While not wishing to be bound by any theory, it is believed that the frozen dough products of the present invention are capable of providing acceptable cooked dough products in freezer-to-oven applications due at least in substantial part to the fact that the dough products comprise the aforementioned chemical leavening system. In particular, the chemical leavening system comprises a combination of two or more chemical leaveners, in addition to an amount of yeast; yeast being included in the dough products of the present invention primarily to provide the desirable flavor that results from the inclusion thereof. The chemical leaveners to be included in the combination desirably and advantageously are to be effective over different temperature ranges, so that in combination, the chemical leavening system is effective over a wider temperature range than can be achieved by a single leavener used alone. Staged rising of the dough product, i.e., rising that takes substantially greater advantage of that portion of the cooking cycle that occurs prior to the structure of the dough product being set, is thus achieved by the inclusion of such a chemical leavening system in the dough products of the present invention.

Chemical leaveners, i.e., chemical leavening acids and bases, produce gas, such as carbon dioxide, as a product of the reaction between at least one chemical leavening acid and at least one other chemical leavening base. The gas so produced serves to expand the dough product. The chemical leavening system included in the dough products of the present invention thus preferably includes an amount at least one chemical leavening base. Any chemical leavening base that is capable of undergoing such a reaction is preferable and thus suitable for use in the dough product of the present invention. Although a base may be included to react with each chemical leavening acid, i.e., more than one base may be utilized, in a preferred embodiment, the chemical leavening base would be capable of reacting with both of the at least two chemical leavening acids. Such chemical leavening bases are well known to those of skill in the art and, as a result, only the exemplary chemical leavening bases, sodium bicarbonate (baking soda), ammonium bicarbonate and potassium bicarbonate, are recited herein. One preferred chemical leavening base, due to its widespread availability, is baking soda.

The chemical leavening system utilized in the dough products of the present invention further preferably comprises at least two chemical leavening acids The two chemical leavening acids can be any two such acids that, when used in combination with the chemical leavening base, provide a period of rising that is longer than for either acid utilized alone and/or provide for the staged rising of the dough product when subjected to a cooking cycle. One way of achieving this objective is to utilize a combination of at least one slow acting chemical leavening acid, i.e., a chemical leavening acid that becomes active at a relatively high temperature, and at least one fast acting chemical leavening acid, i.e., a chemical leavening acid that becomes active at a relatively low temperature.

Suitable fast acting chemical leavening acids include those that have a relatively high degree of solubility in water and are thus capable of reacting with chemical leavening bases at relatively low temperatures. As a result, fast acting chemical leavening acids typically react with the chemical leavening base to produce gas as early as in the dough mixing process and/or early in the cooking cycle. Although each fast acting chemical leavening acid will typically have a different temperature range within which it is effective, it can generally be said that fast acting chemical leavening acids become active when the internal dough temperature reaches at least about 250° C. and generally become inactive at temperatures greater than about 65° C. Suitable fast acting chemical leavening acids for use in the dough products of the present invention include, but are not limited to, any of the sodium acid pyrophosphates (SAPP), monocalcium phosphate monohydrate (MCP), sodium aluminum sulfate (SAS), glucono delta lactone (GDL), potassium hydrogen tartrate (cream of tartar), combinations of these and the like. One example of a preferred fast acting chemical leavening acid is SAPP, which is commercially available under the tradename of RD-1 from Solution Inc. (St. Louis, Mo.) and under the tradename SAPP #4 from Rhodia (Cranbury, N.J.).

Suitable slow acting chemical leavening acids include those that have a relatively lower solubility in water and require higher temperatures in order to react with chemical leavening bases. Consequently, slow acting chemical leavening acids typically react with a chemical leavening base later in the cooking cycle. Again, although each slow acting chemical leavening acid will typically have a different temperature range over which it is effective, it can generally be said that slow acting chemical leavening acids become active when the internal dough temperature reaches at least about 40° C. and generally become inactive at temperatures greater than about 85° C. Slow acting chemical leavening acids that are suitable for use in the dough products of the present invention include, but are not limited to, sodium aluminum phosphate (SALP) and dicalcium phosphate (DCP). One example of a preferred slow acting chemical leavening acid is SALP, which is commercially available under the tradename Levair from Rhodia (Cranbury, N.J.).

Inasmuch as the activation ranges for slow acting and fast acting chemical leavening acids may overlap, chemical leavening agents to be utilized in the dough products of the present invention will be deemed to be either slow acting or fast acting based upon their activation temperatures, with fast acting chemical leavening acids being deemed to be those with an activation temperature of from about 25° C. to less than about 40° C. and slow acting chemical leavening acids being deemed to be those leavening acids with an activation temperature of about 40° C. or higher.

A preferred chemical leavening system utilized in the dough products of the present invention comprises a combination of at least one fast acting chemical leavening acid and at least one slow acting chemical acid, which are desirably activated by the same chemical leavening base. Such a chemical leavening system is advantageously capable of resulting in the staged rising of the frozen dough products when the dough products are subjected to a cooking cycle. For example, in one embodiment wherein the fast acting chemical leavening acid is SAPP the slow acting chemical leavening acid is DCP and the chemical leavening base is baking soda, the chemical leavening system will be active over a temperature range of from about 28° C. (82.4° F.) to about 80° C. (176° F.). Thus, in a cooking cycle that begins when the frozen dough product is at an internal temperature of about 10° F. and proceeds until the internal dough temperature is about 190° F., rising will be capable of occurring over 52% of the cooking cycle.

The particular chemical leavening acids and base(s) to be utilized, and the relative amounts thereof, are selected so that this desirable staged rising occurs. Of course, the particular amounts of the chemical leavening acids and base(s) will depend upon the particular combination that will be utilized to achieve the desired effect for a particular dough product. Bearing these considerations in mind and for illustrative purposes, in one preferred embodiment wherein the chemical leavening base is baking soda, the fast acting chemical leavening acid is SAPP, and the slow acting chemical acid is SALP, the soda is preferably present in an amount of from about 0.1 weight percent (wt %) to about 2 wt %, more preferably from about 0.5 wt % to about 1.0 wt %, SALP is preferably present in an amount of from about 0.01 wt % to about 5.0 wt %, more preferably from about 0.1 wt % to about 1 wt %, and SAPP is preferably present in an amount of from about 0.01 wt % to about 5.0 wt %, more preferably from about 0.1 wt % to about 1 wt %, and in a weight ratio of from about 2:1:1.15, base:SALP:SAPP.

In certain preferred embodiments, the dough product of the present invention may further desirably include an amount of a freezing point depressant. The inclusion of such a freezing point depressant in an effective amount lowers the freezing point at which the dough will freeze. By lowering the freezing point, the formation of ice crystals is hindered inasmuch as the dough structure may not reach an internal temperature at which a substantial amount of water within the dough will freeze. Because fewer ice crystals are formed, fewer structural problems with the dough product are realized upon cooking. Thus, including such a freezing point depressant in the dough products of the present invention can operate to reduce or eliminate any structural problems that might otherwise occur, thereby further enhancing the visual properties of the cooked dough product produced therefrom.

If such a freezing point depressant is to be included in the dough products of the present invention, it can be any agent capable of being effective in this capacity, while not producing adverse effects in the dough products. Suitable freezing point depressants include, for example, but are not limited to, humectants such as propylene glycol and alcohols and polyols, mono- and disaccharides, and combinations thereof: One example of a preferred freezing point depressant for use in the dough products of the present invention is glycerol.

The amount of freezing point depressant to be included is not critical and may be determined empirically for each particular application. The lowest concentration that should be utilized is that amount which at least minimally produces the desired effect. The highest concentration may be limited in some instances by the cost wastefulness that may result from using more of the freezing point depressant than is required, or in some instances, by the adverse effects that may occur if too much of the freezing point depressant is included in the dough product, e.g., as on the organoleptic properties of the cooked dough product. Bearing these considerations in mind, and for one embodiment of the invention wherein the freezing point depressant glycerol is to be included in a dough product of the present invention, glycerol is desirably included in an amount ranging from about 0.01 wt % to about 15 wt %, more preferably in an amount ranging from about 0.1 wt % to about 5 wt %, based upon the weight of the dough product.

With the exception of the aforementioned chemical leavening system and the optional freezing point depressant, the dough products of the present invention may essentially comprise conventional dough formulations. Typical doughs include, for example, fat or shortening in an amount of from about 1 wt % to about 20 wt %, egg solids in an amount of from about 0.01% to about 25%, milk replacer, milk solids or whey in an amount of from about 0.1 wt % to about 12 wt %, sugar in an amount of from about 1 wt % to about 25 wt %, yeast in an amount of from about 1.0 wt % to about 7 wt % and water in an amount of from about 40 wt % to about 80 wt %. The water component of such doughs can, for example, be provided as part of an aqueous fluid such as milk or juice. Any number of other ingredients can also be included in the dough in order to enhance flavor, texture, shape, and the like, as desired. Of course, the particular components chosen and the amounts utilized thereof will vary depending on the particular desired cooked dough product that is to be prepared.

Dough products in accordance with the present invention may be formulated using one type of flour or a mixture of two or more types of flour, as is known in the art. The flour(s) utilized may be either processed or unprocessed, and may be provided as white flour or as a whole grain constituent. Whole grain constituents suitable for use in the dough of the present invention include flours, germ and bran prepared from wheat, alone or in combination with flours, germ and bran prepared from oats, rye sorghum, barley, rice, millet, corn and combinations thereof, among others.

There may be one or more fat components in the dough products of the present invention, depending upon the end-use for the dough. In those embodiments of the invention where the dough product is desirably a regular sweet dough, such as a sweet roll or a coffee cake, there is typically one fat component added to the other dough ingredients at the time the dough is prepared and as a result, is substantially interspersed and distributed throughout the dough. In these types of doughs, the fat component is typically included in the dough in an amount of from about 1 wt % to about 15 wt %.

In a preferred embodiment of the present invention wherein the dough product is a dough laminate, e.g., Danishes and croissants, there are desirably two fat components in the dough product, i.e., the mixed dough component and the roll-in component. The mixed dough component is usually added to the other dough ingredients at the time the dough is prepared and as a result, is substantially interspersed and distributed throughout the dough. The amount of fat in the dough product due to the mixed dough component will depend upon the type of dough product being prepared, but typically ranges from about 1 wt % to about 15 wt %, preferably from about 1 wt % to about 10 wt %, more preferably from about 1 wt % to about 5 wt %. The roll-in component can be added to the prepared dough by laminating the dough and roll-in-shortening component into alternating layers. The amount of shortening added by virtue of the roll-in component typically ranges from about 5 wt % to about 50 wt %, and preferably ranges from about 5 wt % to about 30 wt %, more preferably from about 10 wt % to about 20 wt %.

The type of fat or shortening to be employed is not particularly limited, but rather the fat or shortening, whether in a dough product with only one fat component or two, or whether to be utilized in the mixed dough component or the roll-in component, can be any fat or shortening derived from animal, vegetable and seed sources. One example of a type of shortening that has been found to be particularly well suited to the preparation of dough products in accordance with the present invention is Danish dough margarine, a type of shortening whose properties and commercial sources are well know to those of ordinary skill in the art.

The dough product of the present invention may optionally include a variety of other components that, while not critical to the practice of the present invention, can operate to enhance various properties of the dough products of the present invention. For example, emulsifiers may be incorporated into the dough to increase dough stability, to improve eating quality and to prolong palatability and other keeping qualities. Emulsifiers also aid in the incorporation and retention of air into the dough, and also have an effect on the subdivision of air cells so as to affect the final texture of the baked dough product. If the use of an emulsifier is desired, suitable emulsifiers include, for example, mono- and di-glycerides of fatty acids, mono and diesters of fatty acids, glycerol-lacto esters of fatty acids, ethoxylated mono- and diglycerides, lecithin, combinations of these, and the like.

Other optional ingredients include, for example, dough relaxants, mold inhibitors and various enriching agents. Dough relaxing agents, such as L-cysteine, may be added to the dough products of the present invention to facilitate sheeting of the dough, and are particularly helpful when the sheeting is to be performed by industrial sized equipment.

Mold inhibitors aid in extending the shelf life of the dough products and include, for example, sodium salts of propionic or sorbic acid, sodium diacetate, lactic acid, mixtures thereof, and the like. Enriching agents may be added to the dough products of the present invention to enhance their nutritional value. Typical enriching agents that are added to dough products include, but are not limited to, thiamine, riboflavin, niacin, iron, folic acid, calcium, mixtures thereof, and the like.

Dough products according to the present invention may be prepared utilizing either a straight dough process, i.e., wherein all the ingredients are simply combined to form the dough, or via a brew or sponge dough process, i.e., wherein a brew or sponge comprising flour, water, yeast, and sugar is prepared and allowed to ferment prior to mixing with the other dough ingredients. Either a brew or a sponge may be utilized in the preparation of a dough product in accordance with the present invention, and thus, the relative formulations of each are not critical. Generally speaking, a brew contains a greater quantity of water than a sponge so that, while a sponge typically must be dumped from one container to another, a brew is more flowable, and thus may be pumped into the desired mixing vessel. All of these processes, i.e., straight dough, brew dough and sponge dough processes, are well known to those of ordinary skill in the art, and the choice of which mixing process to employ is not critical to the practice of the present invention.

Once so mixed, the dough product may simply be formed into the desired shape and then frozen, if a laminated dough product is not desired. Alternatively, in those preferred embodiments wherein the dough product is desirably a laminated dough, the mixed dough is formed into a such a laminate. Laminating procedures suitable for use in this capacity may be any of those known and employed in the baking industry and can be varied depending on the equipment available and the desired end product. Generally, dough lamination is achieved by rolling out, or sheeting, the dough into a sheet, adding a layer of the roll-in fat component to the dough layer, and then folding over, rotating, and rolling out the dough laminate several times until the desired number of alternating dough and fat layers are achieved. Alternatively, the dough may be coextruded with the roll-in fat and the resulting dough/fat combination, sheeted, folded, rotated and rolled until the desired number of alternating dough and fat layers are achieved. The laminated dough is then sheeted to the desired thickness, i.e., into a dough pad, from which the desired dough products are formed.

In the embodiment of the invention where the dough product is a laminated dough product, other physical parameters of the dough can be optimized to further enhance the visual and organoleptic properties of the cooked dough products produced therefrom. For example, it has been discovered that by optimizing the layers of fat of the dough laminate, additional rising of the dough product can be caused to occur during the cooking cycle. In particular, it has been found that providing a dough laminate with at least about 64 layers of fat results in cooked dough products with enhanced cooked volumes. Additionally, it has further been discovered that the thickness of the dough pad can be optimized to further reduce, or eliminate the amount of tearing that may otherwise occur on the surface of the dough product upon baking. In particular, it has been discovered that sheeting the dough laminate into a dough pad of from about 3 mm to about 12 mm, preferably, from about 5 mm to about 10 mm, more preferably, from about 6 mm to about 8 mm, prior to shaping and cooking the dough products, results in cooked dough products with fewer, or no, tears on the external surfaces thereof Once shaped, the dough products are frozen, i.e., cooled to an internal dough temperature of 10° F. or less. Freezing may occur at either a fast (e.g., blast freezing) or slow (e.g., static freezing) rate. Freezing time will be greatly dependent upon the size of the dough product. The frozen dough product may then be stored in a frozen state for as long as is desired, or may immediately be cooked.

To cook the dough product, the frozen dough product can be simply removed from the freezing environment and directly placed in the desired cooking environment. The cooking environment selected in which to cook the dough product is not particularly restricted, but rather, the chosen environment may be any environment capable of imparting energy sufficient to cook the dough product. For example, dough products according to the present invention may be baked in a cooking environment comprising a conventional oven, a convection oven, a microwave oven, combinations of these, and the like.

The time and temperature/amount of energy required to cook the dough products will depend, of course, upon the type and size of dough product that is desirably cooked, as well as upon the cooking environment that is selected. A dough product is generally considered to be cooked when it has reached an internal dough temperature of from about 170° F. to about 210° F.

Any combination of cooking environments, times and temperatures capable of achieving this internal dough temperature may be employed to cook the dough products of the present invention. For example, in one embodiment of the invention wherein the dough product is a 3.0 oz cinnamon roll and the cinnamon roll is desirably cooked in a convection oven, a temperature of 310° F. for from about 17 to about 19 minutes has been found to be sufficient to produce a cooked cinnamon roll. If the 3.0 oz cinnamon roll is desirably cooked in a conventional oven, a temperature of 350° degrees for from about 17 to about 19 minutes has been found to be sufficient to produce a cooked cinnamon roll. Finally, if the 3.0 oz cinnamon roll is desirably cooked in a microwave oven, a time of 1.5 minutes at power level 10 in a 700 watt microwave oven has been found to be sufficient to produce a cooked cinnamon roll. When utilizing a conventional or convection oven, the temperature of the oven when the dough product is placed therein is not critical, i.e., the oven need not be preheated. Rather, whether or not to preheat the oven prior to the placement of the dough product therein is desirably determined by end-user considerations.

As described herein, the present invention provides unproofed, frozen dough products that, when cooked without an intervening thawing or proofing step are capable of producing cooked dough products having a substantially increased volume, i.e., at least about 150% of the volume of the frozen, unproofed dough product. It is contemplated, however, that the production of the dough products described herein, and in particular, the production of laminated dough products typically involves many processing operations that may occur over an extended processing time. During these times and operations, a certain amount of dough expansion may occur. Such dough expansion is not expected to be significant, i.e., is not expected to provide an increase in dough volume of 10% or greater, and as such, this dough expansion is not considered to represent "an intervening thawing or proofing step", and thus dough products that experience such an expansion during normal dough processing times and temperatures are considered to be within the scope of the invention.

The present invention will be described below with reference to the following representative examples, wherein unless otherwise indicated, all percentages are weight percentages based upon the total weight of the dough product, dough, filling or brew, as the case may be, all ingredients are at substantially ambient temperature, and all mixing was carried out with a Hobart mixer. Furthermore, each of the Examples utilized the same cinnamon filling formulation, and one of two yeast brew formulations (if any). The formulation and preparation of these items is described hereinbelow under Materials and Methods. Finally, although the following examples illustrate the invention by the description of the production of cinnamon rolls, other dough products are also within the scope of the invention, and in particular, other larninated dough products, such as Danish pastries, Danish twists, Danish rings, brioches, sweet rolls, and the like, either with or without fillings and/or coatings are also within the scope of the invention.

Materials amd Methods

I. Filling

The same filling was utilized in each example, and was prepared according to the following formulation and utilizing the following process:

Cinnamon Filling Formulation

| Ingredient | Weight Percent |
| --- | --- |
| Sugar | 44.68 |
| Shortening | 14.70 |
| Water | 13.02 |
| Cinnamon | 8.27 |
| Corn Syrup | 7.50 |
| Molasses | 4.80 |
| Flour | 2.00 |
| Starch | 1.95 |
| Whey | 1.76 |
| Albumen | 0.73 |
| Salt | 0.59 |
| Total | 100.00 |

The filling was prepared by first mixing the sweeteners, i.e., the sugar, corn syrup and molasses, and fat. The water is then mixed in, followed by the dry ingredients, and the filling mixed until a substantially homogenous mixture was obtained.

II. Yeast Brew

| | Ingredient | Weight % |
| --- | --- | --- |
| | Yeast Brew Formulation 1 | |
| Yeast Brew | Water | 61.98 |
| | Flour | 36.59 |
| | Sugar | 00.92 |
| | Salt | 00.01 |
| | Yeast | 00.50 |
| | Total | 100.00 |
| | Yeast Brew Formulation 2 | |
| Yeast Brew | Flour | 28.04 |
| | Water | 70.34 |
| | Sugar | 1.04 |
| | Salt | 0.01 |
| | Yeast | 0.57 |
| | Total | 100.00 |

Yeast brew formulations 1 and 2 were prepared by first weighing and adding the water, at 90° F.±5° F., to the mixing bowl. The dry ingredients of the yeast brew were then weighed and added to the mixing bowl and the resulting brew mixed at high speed for three (3) minutes or until all of the ingredients were substantially incorporated into the brew. The yeast brew was then allowed to ferment for 30 minutes at ambient. After 30 minutes, the yeast brew was remixed.

III. Dough Lamination Process

The dough formulations of each example were formed into laminates according to the following process. The amount of shortening indicated in each example is layered onto the dough and the combination is sheeted using a Model SS063 Seewer Rondo Sheeter (Seewer AG, Bergdorf, Switzerland). In the first sheeting run, four folds are made and four folds are also made in the second run. In the third sheeting run, two folds are made if a 32-layer laminate is desired, and four folds are made if a 64-layer laminate is desired. In the final run, the dough laminate is sheeted without folding on the Rodo sheeter to a final thickness of about 3 mm to about 12 mm, preferably to a final thickness of about 5 mm to about 10 mm, and more preferably to a final thickness of about 6 mm to about 8 mm.

EXAMPLE 1

This experiment was conducted to evaluate the quality of 1.5 oz and 3.0 oz cinnamon rolls prepared from brew and non-brew systems. In particular, freezer-to-oven cinnamon rolls in accordance with the present invention were prepared according to the following formulations and utilizing the following processes.

I. Dough

TABLE 1

Dough Formulation 1A - Brew Formulation

| | Ingredient | Weight % |
| --- | --- | --- |
| Dough | Flour | 41.46 |
| | Yeast Brew Formulation 1 | 28.37 |
| | Water/ice | 6.49 |
| | Sugar | 3.77 |
| | Corn syrup | 3.73 |
| | Dextrose | 3.51 |
| | Yeast | 1.95 |
| | Glycerol | 1.86 |
| | Shortening | 1.84 |
| | Egg Solids | 1.77 |
| | Whey | 1.49 |
| | Soda | 0.80 |
| | Salt | 0.75 |
| | SAPP | 0.55 |
| | Mono&Di glycerides | 0.50 |
| | Dough Conditioners | 0.50 |
| | Flavor | 0.41 |
| | SALP | 0.40 |
| | Total | 100.00 |

TABLE 2

Dough Formulation 1B - Non-Brew Formulation

| | Ingredient | Weight % |
| --- | --- | --- |
| Dough | Flour | 51.8 |
| | Water/ice | 23.98 |
| | Sugar | 4.03 |

TABLE 2-continued

Dough Formulation 1B - Non-Brew Formulation

| Ingredient | Weight % |
|---|---|
| Corn syrup | 3.73 |
| Dextrose | 3.51 |
| Yeast | 2.09 |
| Glycerol | 1.86 |
| Shortening | 1.84 |
| Egg Solids | 1.77 |
| Whey | 1.49 |
| Soda | 0.80 |
| Salt | 0.75 |
| SAPP | 0.55 |
| Mono&Di glycerides | 0.50 |
| Dough Conditioners | 0.50 |
| Flavor | 0.41 |
| SALP | 0.40 |
| Total | 100.00 |

Brew dough formulation 1A was prepared by first preparing the yeast brew as described hereinabove in Materials and Methods. The ingredients for the dough were then weighed and added to the mixing bowl containing the yeast brew and the resulting dough formulation mixed for one (1) minute on low speed, or until a dough ball was formed, followed by eight (8) minutes at high speed.

Non brew formulation 1B was prepared by weighing and adding all ingredients to a mixing bowl. The dough was then mixed at low speed for one (1) minute, or until a dough ball was formed, followed by eight (8) minutes at medium speed.

II. Dough Laminate

Each of dough formulations 1A and 1B were formed into laminates with 84.5 wt % dough and 15.5% roll-in shortening (Danish dough margarine, maximum moisture content 16%, SFI at 50° F. 26.5±1.5%, 70° F. 20.0±1.5%, 92° F. 15.0±1.0%) as described hereinabove in Materials and Methods.

III. Formation of Cinnamon Rolls

Two sizes of cinnamon rolls, 1.5 oz and 3.0 oz, were prepared to evaluate the impact of the initial size of the dough product, as well as on the impact of the use of a brew or non-brew system on the final baked dough product attributes. Specifically, both sizes of cinnamon rolls were prepared, frozen and baked using a formulation including 82 wt % of the dough laminate formed in Step II and 18 wt % of the cinnamon filling and utilizing the following processes.

The dough laminate was cut into two (2) different sizes of strips: 8.2" strips for 1.5 oz rolls and 11.25" strips for 3 oz rolls. The edges of the dough strips were then creased ¼" from the rolling edge, i.e., the edge of the dough from which rolling is to be initiated. The sealing edge, i.e., the edge of the dough opposite the rolling edge, was then water-moistened in an amount effective to make it adhesive unto itself Next, the cinnamon filling was deposited onto the dough strips and spread evenly across the length of the dough strips leaving a ¼" space at one edge of the dough. Then, the rolling edge was curled over, and the dough torpedo rolled to meet the sealing edge and sealed thereby forming a dough roll. The dough roll was then cut into 1" pieces to form the 1.5 oz rolls and 1.37" pieces to form the 3.0 oz rolls. The prepared cinnamon rolls were then placed on a sheet pan and frozen, i.e., cooled to a temperature of 0° F. or below. Once so frozen, the cinnamon rolls were removed from the freezer, placed 2" apart on a parchment lined pan, and baked in a 350° conventional oven for 12 minutes for 1.5 oz rolls, or 17 minutes for 3.0 oz rolls, or until the rolls were golden brown.

IV. Results

The resulting baked 1.5 oz cinnamon rolls had baked specific volumes of from 2.2 to 2.7. Furthermore, all of the 1.5 oz rolls were visually and organoleptically excellent and no difference was seen between the brew and non-brew formulations.

The resulting baked 3.0 oz cinnamon rolls had baked specific volumes of from 2.3 (non-brew) to 2.4 (brew formulation). Additionally, with the exception of some extremely slight side wall tearing in some of the rolls, the 3.0 oz rolls were predominantly visually and organoleptically excellent with no substantial differences seen between the brew and non-brew formulations.

This example illustrates that the dough product of the present invention can be used to provide freezer-to-oven cinnamon rolls, prepared either with or without a brew system, that when baked, have exceptional visual and orga- noleptic properties and that experience an increase in baked specific volume of at least 200%, and up to 270% over the volume of the frozen dough product.

EXAMPLE 2

This experiment was conducted to evaluate the quality of a cinnamon roll containing a combination of chemical leaveners as opposed to cinnamon rolls prepared utilizing only one chemical leavener. In particular, freezer-to-oven cinnamon rolls in accordance with the present invention were prepared according to the following formulations and utilizing the following processes:

I. Dough

TABLE 3

Dough Formulation 2A - Control Formulation/SALP Only

|  | Ingredient | Weight % |
|---|---|---|
| Dough | Flour | 41.68 |
|  | Yeast Brew Formulation 1 | 28.37 |
|  | Water/ice | 6.52 |
|  | Sugar | 3.79 |
|  | Corn syrup | 3.75 |
|  | Dextrose | 3.53 |
|  | Yeast | 1.96 |
|  | Glycerol | 1.87 |
|  | Shortening | 1.85 |
|  | Egg Solids | 1.78 |
|  | Whey | 1.50 |
|  | Salt | 0.75 |
|  | Soda | 0.61 |
|  | SALP | 0.61 |
|  | Mono&Di glycerides | 0.50 |
|  | Flavor | 0.41 |
|  | Dough Conditioners | 0.502 |
|  | Total | 100.00 |

TABLE 4

Dough Formulation 2B - SALP/SAPP Leavener Combination

|  | Ingredient | Weight % |
|---|---|---|
| Dough | Flour | 41.46 |
|  | Yeast Brew Formulation 1 | 28.23 |

TABLE 4-continued

Dough Formulation 2B - SALP/SAPP Leavener Combination

| Ingredient | Weight % |
|---|---|
| Water/ice | 6.49 |
| Sugar | 3.77 |
| Corn syrup | 3.73 |
| Dextrose | 3.51 |
| Yeast | 1.95 |
| Glycerol | 1.86 |
| Shortening | 1.84 |
| Egg Solids | 1.77 |
| Whey | 1.49 |
| Soda | 0.80 |
| Salt | 0.75 |
| SAPP | 0.55 |
| Mono&Di glycerides | 0.50 |
| Dough Conditioners | 0.50 |
| Flavor | 0.41 |
| SALP | 0.40 |
| Total | 100.0 |

TABLE 5

Dough Formulation 2C -SALP/SAPP Leavener Combination

| | Ingredient | Weight % |
|---|---|---|
| Yeast Brew | N/A | N/A |
| Dough | Flour | 51.8 |
| | Water/ice | 23.98 |
| | Sugar | 4.03 |
| | Corn syrup | 3.73 |
| | Dextrose | 3.51 |
| | Yeast | 2.09 |
| | Glycerol | 1.86 |
| | Shortening | 1.84 |
| | Egg Solids | 1.77 |
| | Whey | 1.49 |
| | Soda | 0.80 |
| | Salt | 0.75 |
| | SAPP | 0.55 |
| | Mono&Di glycerides | 0.50 |
| | Dough Conditioners | 0.50 |
| | Flavor | 0.41 |
| | SALP | 0.40 |
| | Total | 100.0 |

Brew dough formulations 2A and 2B were prepared by first preparing the yeast brew as described hereinabove in Materials and Methods. The dough ingredients, with the exception of yeast, were weighed and added to a separate mixing bowl and mixed for one (1) minute at low speed. The yeast brew and yeast were then added to the mixing bowl and the resulting dough mixed at low speed for one (1) minute, or until a dough ball was formed. The speed of the mixer was then increased slightly, i.e., from 1 to 2, and the dough mixed for an additional seven (7) minutes.

Non-brew dough formulation 2C was prepared by weighing and adding all of the ingredients to a mixing bowl and mixing the dough at low speed for one (1) minute, or until a dough ball was formed. The speed of the mixer was then increased slightly, i.e., from 1 to 2, and the dough mixed for an additional seven (7) minutes.

II. Dough Laminate

Each of dough formulations 2A, 2B and 2C were formed into laminates with 85.0 wt % dough and 15.0% roll-in shortening (Danish dough margarine, maximum moisture content 16%, SFI at 50° F. 26.5±1.5%, 70° F. 20.0±1.5%, 92° F. 15.0±1.0%) as described hereinabove in Materials and Methods.

III. Formation of Cinnamon Rolls

Cinnamon rolls were prepared including 82 wt % of the dough laminate formed in Step II and 18 wt % of the cinnamon filling prepared as described in Materials and Methods utilizing the following processes.

Specifically, the dough laminate was cut into 8.5" wide strips. The edges of the dough strips were then creased ¼" from the rolling edge and the sealing edge was then water-moistened. Next, the cinnamon filling was deposited onto the dough strips and spread evenly across the length of the dough strips leaving a ½" space at one edge of the dough. Then, the rolling edge was curled over, and the dough torpedo rolled to meet the sealing edge and sealed thereby forming a dough roll. The dough roll was then cut into 1 ⅛" pieces to form 3.0 oz rolls. The prepared cinnamon rolls were then placed on a sheet pan and frozen. Once so frozen, the cinnamon rolls were removed from the freezer, placed two (2) inches apart on a parchment lined pan, and baked in a 350° conventional oven for 18 minutes, or until the rolls were golden brown.

IV. Results

The results of this experiment are summarized below in Table 15.

TABLE 6

Comparison of Cinnamon Rolls comprising One Chemical Leavener with Cinnamon Rolls Comprising a Combination of Chemical Leaveners

| Formulation | Moistness[1] | Tenderness[1] | Exterior Flakiness[1] | BSV Conventional | BSV Convection | Yeast[2] Flavor |
|---|---|---|---|---|---|---|
| 2A (control) | 8 | 8 | 5 | 1.82 | 2.07 | 1 |
| 2B | 7 | 8 | 5 | 1.90 | 2.1 | 1 |
| 2C | 8 | 8 | 6 | 1.96 | 2.3 | 1 |

[1]On a scale of 1–10, 10 is better
[2]On a scale of 1–10, 1 is low

As is shown, the resulting baked cinnamon rolls comprising a combination of chemical leaveners (the "test rolls") had baked specific volumes of from 1.90 to 2.3, i.e., better than that of the control cinnamon rolls. Finally, the test rolls had values of visual or organoleptic properties that were either comparable to or better than those exhibited by the control cinnamon rolls comprising only one chemical leavener.

Thus, this example illustrates that a combination of chemical leaveners can produce enhanced properties when utilized in cinnamon rolls prepared in accordance with the present invention, relative to cinnamon rolls prepared with only one chemical leavener. In particular, the combination of chemical leaveners utilized in formulations 2B and 2C, SALP/SAPP, resulted in cinnamon rolls with moistness, tenderness and exterior flakiness either equivalent to or greater than that of the control cinnamon rolls, and furthermore, produced baked cinnamon rolls of a greater baked specific volume when baked in either a conventional or convection oven.

EXAMPLE 3

This example was conducted to evaluate the impact of glycerol when included in dough formulations for cinnamon rolls. Specifically, freezer-to-oven cinnamon rolls in accordance with the present invention were prepared according to the following formulations and utilizing the following processes:

I. Dough

TABLE 7

Formulation 3A - Control Formulation (No Glycerol)

| | Ingredient | Weight % |
|---|---|---|
| Dough | Flour | 52.83 |
| | Yeast Brew Formulation 2 | 17.65 |
| | Water/ice | 6.49 |
| | Sugar | 4.19 |
| | Corn syrup | 3.95 |
| | Dextrose | 3.72 |
| | Yeast | 2.17 |
| | Shortening | 1.95 |
| | Egg Solids | 1.88 |
| | Whey | 1.58 |
| | Salt | 0.79 |
| | Soda | 0.65 |
| | SALP | 0.65 |
| | Mono&Di glycerides | 0.53 |
| | Dough Conditioners | 0.53 |
| | Flavor | 0.44 |
| | Total | 100.00 |

TABLE 8

Dough Formulation 3B - Glycerol Formulation

| | Ingredient | Weight % |
|---|---|---|
| Dough | Flour | 52.83 |
| | Yeast Brew Formulation 2 | 17.65 |
| | Water/ice | 4.49 |
| | Sugar | 4.19 |
| | Corn syrup | 3.95 |
| | Dextrose | 3.72 |

TABLE 8-continued

Dough Formulation 3B - Glycerol Formulation

| Ingredient | Weight % |
|---|---|
| Yeast | 2.17 |
| Glycerol | 2.00 |
| Shortening | 1.95 |
| Egg Solids | 1.88 |
| Whey | 1.58 |
| Salt | 0.79 |
| Soda | 0.65 |
| SALP | 0.65 |
| Mono&Di glycerides | 0.53 |
| Dough Conditioners | 0.53 |
| Flavor | 0.44 |
| Total | 100.0 |

Dough formulations 3A and 3B were prepared by first preparing the yeast brew as described above in Materials and Methods. The ingredients for the dough, with the exception of water, were then weighed and added to a separate mixing bowl and mixed for one (1) minute at low speed. The water and the prepared brew were then added to the mixing bowl and the resulting dough mixed at medium speed for eight (8) minutes.

II. Dough Laminate

Each of dough formulations 3A and 3B were formed into laminates with 82.0 wt % dough and 18.0% roll-in shortening (Danish dough margarine, maximum moisture content 16%, SFI at 50° F. 26.5±1.5%, 70° F. 20.0±1.5%, 92° F. 15.0±1.0%) as described hereinabove in Materials and Methods.

III. Formation of Cinnamon Rolls

Cinnamon rolls were prepared including 82 wt % of the dough laminate formed in Step II and 18 wt % of the cinnamon filling prepared as described in Materials and Methods utilizing the following processes.

The dough laminate was cut into an 11.3" sheet. The edge of the dough sheet was then creased ¼" from the rolling edge, and the sealing edge water-moistened. Next, the cinnamon filling was deposited onto the dough sheet and spread evenly across the length of the dough sheet leaving a ¼" space at one edge of the dough. Then, the rolling edge was curled over and the dough torpedo rolled to meet the sealing edge and sealed, thereby forming a dough roll. The dough roll was then cut into one inch (1") pieces to form 1.75 oz rolls. The prepared cinnamon rolls were then placed on a sheet pan and frozen. Once so frozen, the cinnamon rolls were removed from the freezer, placed two (2) inches apart on a parchment lined pan, and baked in a 310° F. convection oven for 17 to 19 minutes, to an internal temperature of 190° F., or until the rolls are golden brown.

IV. Results

Eight (8) out of ten (10) of the baked control cinnamon rolls, i.e., without glycerol, had splitting on their outer surfaces, whereas only one (1) of the ten (10) test cinnamon rolls, i.e., comprising glycerol, had splitting on their outer surfaces.

Although this example was conducted utilizing a dough formulation that includes only one chemical leavener, it is presumed that glycerol will also exert these positive effects when included in a dough product in accordance with the present invention.

Other embodiments of this invention will be apparent to those skilled in the art upon consideration of this specification or from practice of the invention disclosed herein.

Various omissions, modifications, and changes to the principles and embodiments described herein may be made by one skilled in the art without departing from the true scope and spirit of the invention which is indicated by the following claims.

What is claimed is:

1. An unproofed, frozen dough product comprising:
   (a) flour, water and yeast; and
   (b) a chemical leavening system comprising from about 0.1 wt % to about 1 wt % of at least one fast acting chemical leavening acid and from about 0.1 wt % to about 1 wt % of at least one slow acting chemical leavening acid wherein the chemical leavening system is capable of resulting in the staged rising of the frozen dough product when the frozen dough product is subjected to a cooking cycle.

2. The dough product of claim 1 wherein the dough product comprises a laminated dough.

3. The dough product of claim 1 wherein the chemical leavening system comprises at least two chemical leavening acids.

4. The dough product of claim 3 wherein the chemical leavening system comprises at least one fast acting chemical leavening acid and at least one slow acting chemical leavening acid.

5. The dough product of claim 4 wherein the fast acting chemical leavening acid comprises sodium acid pyrophosphate and the slow acting chemical leavening acid comprises sodium aluminum phosphate.

6. The dough product of claim 1 further comprising a freezing point depressant.

7. The dough product of claim 6 wherein the freezing point depressant comprises glycerol.

8. The dough product of claim 7 wherein the amount of glycerol in the dough product is in the range of from about 0.01 weight percent to about 15 weight percent, based upon the total weight of the dough product.

9. The dough product of claim 8 wherein the amount of glycerol in the dough product is in the range of from about 0.1 weight percent to about 5 weight percent, based upon the total weight of the dough product.

10. A freezer-to-oven dough product comprising flour, water, yeast and a chemical leavening system comprising from about 0.1 wt % to about 1 wt % of at least one fast acting chemical leavening acid and from about 0.1 wt % to about 1 wt % of at least one slow acting chemical leavening acid and wherein in a first state the dough product is unproofed and frozen and wherein in a second state the dough product is cooked and has a volume of at least about 150% of the volume of the dough product when in the first state and wherein the chemical leavening system causes staged rising of the dough product during a cooking cycle so that the second state of the dough product can be achieved by subjecting the dough product in the first state to a cook cycle without an intervening thawing or proofing step.

11. The dough product of claim 10 wherein the dough product is a dough laminate.

12. The dough product of claim 10 wherein the chemical leavening system comprises at least two chemical leavening acids.

13. The dough product of claim 12 wherein the chemical leavening system comprises at least one fast acting chemical leavening acid and at least one slow acting chemical leavening acid.

14. The dough product of claim 13 wherein the fast acting chemical leavening acid comprises sodium acid pyrophosphate and the slow acting chemical leavening acid comprises sodium aluminum phosphate.

15. The dough product of claim 10 further comprising a freezing point depressant.

16. The dough product of claim 15 wherein the freezing point depressant is glycerol.

17. The dough product of claim 16 wherein the amount of glycerol in the dough product is in the range of from about 0.1 weight percent to about 5 weight percent, based upon the total weight of the dough product.

* * * * *

UNITED STATES PATENT AND TRADEMARK OFFICE
CERTIFICATE OF CORRECTION

PATENT NO. : 6,589,583 B1
DATED : July 8, 2003
INVENTOR(S) : Hansen et al.

It is certified that error appears in the above-identified patent and that said Letters Patent is hereby corrected as shown below:

<u>Column 7,</u>
Line 54, "250" should be corrected to -- 25 --

<u>Column 13,</u>
Line 13, "larninated" should be corrected to -- laminated --

Signed and Sealed this

Twenty-eighth Day of October, 2003

JAMES E. ROGAN
*Director of the United States Patent and Trademark Office*